US007094017B2

(12) United States Patent
Kurita

(10) Patent No.: US 7,094,017 B2
(45) Date of Patent: Aug. 22, 2006

(54) VERTICAL SHAFT DRIVING DEVICE FOR VERTICAL WIND MILLS OR THE LIKE AND ELECTRIC POWER GENERATOR USING THE SAME

(76) Inventor: Hidemi Kurita, 146 Hirashibadai, Nagano-shi, Nagano 380-0946 (JP)

( * ) Notice: Subject to any disclaimer, the term of this patent is extended or adjusted under 35 U.S.C. 154(b) by 63 days.

(21) Appl. No.: 10/500,608

(22) PCT Filed: May 14, 2003

(86) PCT No.: PCT/JP03/06030

§ 371 (c)(1),
(2), (4) Date: Jul. 1, 2004

(87) PCT Pub. No.: WO03/098035

PCT Pub. Date: Nov. 27, 2003

(65) Prior Publication Data

US 2005/0079054 A1 Apr. 14, 2005

(30) Foreign Application Priority Data

May 16, 2002 (JP) ............................. 2002-141758

(51) Int. Cl.
*F03B 15/06* (2006.01)
*F03D 7/06* (2006.01)
(52) U.S. Cl. ........................ 415/4.2; 415/4.4; 415/907; 416/44
(58) Field of Classification Search .................. 415/4.2, 415/4.4, 2.1, 907; 416/51, 44, 118, 119
See application file for complete search history.

(56) References Cited

U.S. PATENT DOCUMENTS 4,494,007 A * 1/1985 Gaston ........................ 290/44

5,380,149 A * 1/1995 Valsamidis ................... 415/2.1
6,884,020 B1 * 4/2005 Kaare et al. ................... 415/1

FOREIGN PATENT DOCUMENTS

| EP | 0679805 A1 | 11/1995 |
| JP | 55-142978 A | 11/1980 |
| JP | 57-18464 A | 1/1982 |
| JP | 2-144673 A | 12/1990 |
| JP | 11-62813 A | 3/1999 |
| JP | 2001-289150 A | 10/2001 |
| JP | 2002-106458 A | 4/2002 |

* cited by examiner

*Primary Examiner*—Edward K. Look
*Assistant Examiner*—Devin Hanan
(74) *Attorney, Agent, or Firm*—Birch, Stewart, Kolasch and Birch, LLP

(57) ABSTRACT

A vertical shaft driving device wherein a plurality of rotary blades (8a, 8b, 8c and 8d) each including a blade (10) supported on a planetary shaft are equally arranged circumferentially of a central shaft (12) and capable of orbital motion integrally with the central shaft (12), and wherein the rotary blades are arranged in a multipoint intersection form, in which blade faces of the blades (10) are obliquely disposed with respect to radial directions with a center at the central shaft (12). By arranging the blades (10) in the multipoint intersection form, it is possible to provide the vertical shaft driving device, in which air flows or water flows can be efficiently utilized to obtain a great output power.

11 Claims, 11 Drawing Sheets n = 4 n = 3 n = 2

VERTICAL SHAFT DRIVING DEVICE FOR VERTICAL WIND MILLS OR THE LIKE AND ELECTRIC POWER GENERATOR USING THE SAME

FIELD OF TECHNOLOGY

The present invention relates to a vertical shaft driving device, which is rotated by an air flow or a water flow, and an electric generator driven by the driving device.

BACKGROUND OF TECHNOLOGY

These days, importance of global environmental has increased, so a wind power attracts scientists' attention as clean energy, and many types of wind mills have been studied and developed. A drag-based vertical shaft wind mill is capable of operating without wind direction control, and aerodynamic noise, bad influence to scenery and moving shadows are less than those of a horizontal shaft wind mill, e.g., a propeller type wind mill, so the vertical shaft wind mills are good to install on roofs of houses and buildings as small-scale electric generators. Torque of the drag-based vertical shaft wind mills are large, but rotational speeds and energy converting efficiency thereof are low, so the vertical shaft wind mills are not practically used, other than Savonius type wind mills, as electric generators.

To utilize the merits of the drag-based vertical shaft wind mills and use the wind mills as small-scale electric power plants, an output power must be increased, so the conventional Savonius type wind mills have been improved.

For example, a Savonius type wind mill having fixed vanes, which are provided on the outer side of rotary blades so as to introduce a large amount of air to the rotary blades and reduce resistance caused by wind, is disclosed in Japanese Patent Gazette No. 11-62813.

Another Savonius type wind mill having at least one rotatable reflector, which is provided on the outer side of rotary blades so as to adjust air flows, improve an output power and make the output power stable, is disclosed in Japanese Patent Gazette No. 2001-289150.

However, in the Savonius type wind mill disclosed in Japanese Patent Gazette No. 11-62813 which has the fixed vanes provided on the outer side of the rotary blades, a part of air flows introduced by the fixed vanes collide with rear faces of the rotary blades (faces on the forward sides of the rotary blades), so that the rotation of the wind mill is hindered. On the other hand, in the Savonius type wind mill disclosed in Japanese Patent Gazette No. 2001-289150 which has the reflector separated away from the rotary blades, a size of the wind mill must be large in comparison with a diameter of a rotor.

In the Savonius type wind mill, if overlapped parts of rotary blades, each of which are formed into a half cylindrical shape, are small, tip speed ratio is decreased by increasing load so that air flows stay on the front side of the rotary blades (on wind receiving face sides of the rotary blades) and a braking force works to the rotary blades on an upper stream side. If the overlapped parts are made large so as to avoid this disadvantage, the rotary blades must be large in comparison with a rotor so that the rotary blades must be heavy.

Namely, in the Savonius type wind mills, it is impossible to efficiently convert air flows, which have been intercepted, collected and straightened by the fixed vanes, into torque, so that it is difficult to highly increase the output power. For example, in the Savonius type wind mill disclosed in Japanese Patent Gazette No. 2001-289150, two reflectors, whose sizes are ½ of the diameter of the rotor, are provided on the upper stream side, maximum increase of the output power is about 50% even if positions and angles of the reflectors are adjusted, therefore substantial increase of the output power is not so large in spite of providing the reflectors which makes the wind mill larger.

In the gazette, the drag-based vertical shaft wind mill is capable of electrically controlling the positions and the angles of the reflectors, which are provided on the outer side of the Savonius rotor, so as to automatically control the rotational speed of the rotor and automatically protect the rotor against strong wind, but a complex structure including a mechanism for moving the reflectors, an electric power source, a motor, a wind direction sensor, a control unit, etc. is required.

Thus, the present invention was invented to solve the disadvantages of the conventional wind mills, and an object of the present invention is to provide a vertical shaft driving device, which is capable of generating a high output power in comparison with the conventional vertical shaft Savonius type wind mills (especially under high load) and controlling rotation of the device so as to automatically protect against strong wind without an external driving source, and an electric generator driven by the driving device.

Note that, water wheels driven by water flows have been used as devices employing natural energy. Water wheels are also required to efficiently use water flows, so water wheels driven by ocean streams, tides, etc. have the same disadvantages as the wind mills have.

In the present specification, the word "vertical shaft driving device" means an device for rotating a vertical shaft by natural energy, e.g., air flows, water flows.

DISCLOSURE OF THE INVENTION

To achieve an object of the present invention, the present invention has following structures.

Namely, in the vertical shaft driving device, a plurality of rotary blades each including a blade supported on a planetary shaft are equally arranged circumferentially of a central shaft and capable of orbital motion integrally with the central shaft, and the rotary blades are arranged in a multipoint intersection form, in which blade faces of the blades are obliquely disposed with respect to radial directions with a center at the central shaft. By arranging the blades in the multipoint intersection form, it is possible to provide the vertical shaft driving device, in which air flows or water flows can be efficiently utilized to obtain a great output power.

Especially, in the case that four rotary blades are arranged in the circumferential direction of the central shaft, a line extended from a blade face of each rotary blade intersects the adjacent rotary blade at the right angle, so air flows, which have once collided with one rotary blade, recollides with the adjacent rotary blade at angle of 90 degrees; using efficiency of air flows can be maximized.

The vertical shaft driving device may further comprise: a cylinder section, in which the central shaft and the rotary blades can be rotated; and a fixed vane section having a plurality of guide vanes, which are arranged around the cylinder section at regular intervals so as to straighten air flows or water flows and introduce them to the rotary blades, so as to further efficiently gain torque generated by a fluid.

In the vertical shaft driving device, a rectifying plate, which straightens and introduces a fluid to the rotary blades, may be provided to the fixed vane section, and each of the rotary blades may have: an upper circular disk, which is provided to an upper end of the blade; a lower circular disk, which is provided to a lower end of the blade; and a circular rectifying plate, which is provided in parallel to and between the upper and the lower circular disks and which is extended from both faces of the blade. By straightening the fluid with the rectifying plate and colliding the straightened fluid with the rotary blades, the output power can be efficiently increased.

In the vertical shaft driving device, each of the rotary blades may be formed into a flat plate and have a sub-flat blade, which is provided nonparallel on a rear side (a forward side) or a front side (a wind receiving face side) of each of the blades so as to form a nonparallel double plate, whereby generating a counter force, whose direction is opposite to a rotational direction, can be prevented, and total area of the blades can be broadened to improve efficiency of kinetic energy of a fluid. With this structure, the output power can be further increased, and output function during high load can be improved.

In the vertical shaft driving device, each of the blades may be formed into a shallow concave (small curvature) plate, whose curvature is smaller than that of a half-cylindrical blade of a paddle type vertical shaft wind mill, and has a sub-shallow concave (small curvature) blade, which is provided nonparallel on a rear side (a forward side) or a front side (a wind receiving face side) of each of the blades so as to form a nonparallel double plate, whereby generating a counter force, whose direction is opposite to a rotational direction, can be prevented, and total area of the blades can be broadened to improve efficiency of kinetic energy of a fluid. With this structure, the output power can be further increased.

The vertical shaft driving device may further comprise a rotation control unit, which makes angles of the blade faces of the blades, with respect to the radial directions of the central shaft, large so as to reduce drag forces, which work to the blades and restrict a rotational speed of the rotary blades, when the rotational speed of the rotary blades exceeds a prescribed speed; with this structure, control of the rotational speed of the rotary blades and automatic protection against high wind can be performed.

The electric generator is connected to the vertical shaft driving device of the present invention, wherein a torque of the central shaft is transmitted to the electric generator. With this structure, a small and practical electric generator, which can be installed on roofs of houses and buildings, can be provided. Note that, the vertical shaft driving device can be further applied to a power source of a wind power ship, an aeration unit for a sewage disposal plant, an agitation device, a water pumping source of a dam, etc.

Structures and functions of the rotary blades, the fixed vane section and the rotation control unit of the vertical shaft driving device of the present invention will be explained. Note that, the central shaft of the vertical shaft driving device is usually arranged in the vertical direction, but the central shaft may be inclined with respect to the vertical direction according to an installing position, etc. In the following description, the vertical shaft driving device is applied to a wind mill, but the device may be applied to a water wheel as well.

1. Arrangement of Rotary Blades

In the conventional drag-based paddle type vertical shaft wind mill, the rotary blades are provided to make directions of the blade faces (each of which is a direction of a line connecting an inner edge and an outer edge of each blade) parallel to radial lines extended from a central shaft as shown in FIG. 8B (a radial form).

On the other hand, in the device of the present invention, a direction of a blade face of each blade is arranged to diagonally intersect the radial line extended from the central shaft (with an angle $\beta$), and a line extended in the direction of each blade face intersects the blade face of the adjacent blade as shown in FIGS. 3 and 8A (a multipoint intersection form). In the case of having two rotary blades, wind receiving faces are formed into concave faces, and a line extended from the receiving face of the one blade in the tangent direction intersects the other blade. Especially, in the case that four rotary blades are arranged to form the multipoint intersection form, a line extended from a blade face of each rotary blade intersects the adjacent rotary blade at the right angle (see FIG. 8A), so that using efficiency of air flows can be maximized. Namely, in the case of arranging the rotary blades in the multipoint intersection form shown in FIG. 9D, each air flow, which has collided with the blade and ran toward the central shaft, collides with the blades, so each air stream repeatedly collides with the blades many times until going outside of the device, so that a great output power for rotating the rotary blades can be obtained (a multiple collision effect). On the other hand, in the cases of arranging the blades in the radial form as shown in FIGS. 9A–C, function of multiple collision of air flows is small, so that an output power of the wind mill is smaller than that of the present invention.

In the case that a width (a chord length) of the rotary blade and separations between the adjacent rotary blades are equal to those of the conventional wind mill whose rotary blades are radially arranged, a diameter of a rotor of the present invention is shorter than that of the conventional device, so that the size of the device of the present invention can be smaller. The conventional radial arrangement of the rotary blades is shown in FIG. 9C; the multipoint intersection arrangement of the rotary blades is shown in FIG. 9D.

By providing the fixed vane section on the outer side of the rotary blades so as to collide air flows, which have been collected and straightened, with the rotary blades, which are arranged to form the multipoint intersection arrangement, the output power of the device can be much greater than that of the conventional vertical shaft Savonius type wind mill, and the output power can be stably gained even if a wind direction frequently changes.

2. Method of Forming Multipoint Intersection Form

To arrange the blades in the multipoint intersection form, a plurality of the planetary shafts are arranged on a circumference of a circle, which is coaxial to the central shaft, at regular intervals, and rotatably held by the arms fixed to the central shaft, and the blades are fixed to the planetary shafts and arranged to make the blade faces of the blades diagonally intersect the radial lines from the central shaft at the prescribed angle. As shown in FIG. 8A, an angle between the blade face and a face passing the blade and the central shaft (i.e., a radial line extended from the central shaft) is the angle $\beta$; if $\beta$ is zero, the arrangement of the rotary blades is the radial arrangement.

3. Fixed Vane Section

The fixed vane section has a plurality of the guide vanes, which are provided on the outer side of the rotary blades capable of moving around the central shaft, and slant plates, which are provided on the upper side and the lower side of the guide vanes.

Each guide vane crosses a tangent line of a circumcircle of the rotary blades at a prescribed angle $\alpha$ (according to FIG. 12, a proper angle is about 40 degrees); each rotary blade is sheltered, by the guide vanes, from wind while the rotary blade is in a zone, in which the rotary blade rotates in the direction opposite to the wind direction, and introduce the wind toward the rotary blade in another zone, in which the rotary blade rotates in the direction same to the wind direction. The fixed vane section shelters and collects air flows and further straightens the air flows, so strong and straightened air flows can be applied to the rotary blades in comparison with a wind mill having no fixed vane section.

The slant plates, which are respectively provided on the upper side and the lower side of the guide vanes, introduce winds, which have entered the fixed vane section from an upper side and a lower side of the rotary blades, to the rotary blades so as to increase a force for rotating the rotary blades.

The guide vanes 30 of the fixed vane section may be pivotably held so as to adjust the angles of the guide vane, the guide vanes 30 may be fit in the slant plates 32a and 32b, and the guide vanes 30 may be fixed by screws.

4. Structures of Rotary Blades

The rotary blades should satisfy the following conditions (1) and (2)

(1) An inner end of the fixed vane section is located close to the rotary blades so as to introduce all air flows, which enter via the fixed vane section, to a rotation area (the cylinder section) of the rotary blades and collide the air flows with said blades with high collision rate.

(2) The rotary blades constitute a nonaccumulating structure, in which inner edges of the adjacent rotary blades are separated each other so as not to accumulate a fluid on the central shaft side, so as to restrict accumulating air flows, which have collided with the blades and changed flowing directions, on the forward sides of the rotary blades and applying a counter force, whose direction is opposite to the rotational direction of the rotary blades, to the rotary blades. A conceptual structure is shown in FIG. 9D.

In the high collision structure of (1), if the rotational speed of the rotary blades in the cylinder section is 1/n of an air speed, (1−1/n) of the air flows, which have collided with the blades, should pass through gaps between the blades. Namely, a separation "d" between the adjacent blades and the width (the chord length) "W" of each blade should satisfy the following formula so as to constitute the nonaccumulating structure.

$$(1-V_t/U_0)WU_0 = d(U_0'-U_0)$$

Note that, $U_0$ is an air speed in the cylinder section; $U_0'$ is an air speed between the adjacent rotary blades; and $V_t$ is a speed of the rotary blades.

Therefore, the separation "d" between the adjacent rotary blades is determined on the basis of the following formula.

$$d = W(1-V_t/U_0)/(U_0'/U_0-1)$$

Note that, values of "$V_t/U_0 = 1/n$" and "$U_0'/U_0$" are object values, which are determined when the device is designed.

5. Shape of Rotary Blade

A shape of the rotary blade may be selected from the following types.

(a): a flat plate type, (b): a nonparallel double plate type, (c): a shallow concave (small curvature) plate type, (d): a nonparallel double concave plate type, and (e): a shallow concave (small curvature) Savonius type.

The above described shapes are shown in FIGS. 10A–E. FIG. 10A shows the flat plate type rotary blades; FIG. 10B shows the nonparallel double plate type rotary blades; FIG. 10C shows the shallow concave (small curvature) plate type rotary blades; FIG. 10D shows the nonparallel double concave plate type rotary blades; and FIG. 10E shows the shallow concave (small curvature) Savonius type rotary blades. The output power of the nonparallel double concave plate type rotary blades is larger than that of others.

According to efficiency of using wind energy, a suitable number of the rotary blades "(a)–(d)" is four; and a suitable number of the rotary blades "(e)" is two or three.

As shown in FIG. 10F, each of the nonparallel double plate type rotary blades has a blade P1 and at least one nonparallel sub-blade P2, which is provided on a forward side (or a wind receiving side) of the main blade; with this structure, no counter force, whose direction is opposite to the rotational direction of the rotary blades, works to the rotary blades, total sweep area can be broader, and efficiency of using air flows and straightening air flows can be improved.

Each of the sub-blades P2 on the forward side is arranged and headed so as to make a passage section ratio, which is a ratio of a passage section of the fluid on the wind receiving face of the sub-blade P2 (on the main blade P1 side) to that on the forward side thereof (on the opposite side with respect to the blade P1), at a front edge equal to that at a rear edge, i.e., a:b=a':b' in the example shown in FIG. 10F; with this structure, no counter force, whose direction is opposite to the rotational direction of the rotary blades, works to the rotary blades.

Preferably, a separation between the blade P1 and the sub-blade P2 is made equal to that between the adjacent guide vanes of the fixed vane section so as to improve efficiency.

In the nonparallel double (concave) plate type rotary blades, a rate of passing air flows, which enter via the fixed vane section, through the cylinder section without colliding with the rotary blades can be lowered, so that the efficiency of using the air flows can be improved. By passing air flows through a space between the main blade and the sub-blade, the straightened air flows can be introduced to the rotary blade on the downstream side, so that a larger colliding power can generate a greater output power. Preferably, the nonparallel double (concave) plate type can be effectively applied to a large scale wind mill, in which separations between the adjacent rotary blades are long.

In the shallow concave (small curvature) plate type rotary blades and the shallow concave Savonius type rotary blades, curvature of a concave face of each rotary blade, which is formed into a cylindrical shape, is made smaller than that of the half cylindrical-shaped rotary blade of the conventional paddle type or Savonius type wind mill; with this structure, collision of air flows, which have entered from the fixed vane section, with projected faces of the half cylindrical-shaped rotary blades can be prevented, so that no counter force, whose direction is opposite to the rotational direction of the rotary blades, works to the rotary blades (see FIG. 10E). In FIG. 10, each of the concave rotary blades is constituted by a concave plate, but the concave face may be formed by combining flat plates.

6. Blade Angle and Output Power of Wind Mill

In the multiple collision type wind mill of the present invention, a relationship shape between the blade angle β and the output power of the wind mill is shown in FIG. 11. Experiments were performed with: the flat plate type and the nonparallel double plate type shown in FIGS. 10A and 10B, each of which had four rotary blades; the half cylindrical type which was used instead of the shallow concave plate type shown in FIG. 10C; and the conventional Savonius type (an overlap ratio was 0.5) having two rotary blades.

In FIG. 11, the blade angle β was varied, a relative value of load for hindering the rotation of the wind mill was increased 1 time, 2 times and 3.5 times. All of the flat plate type, the nonparallel double plate type and the half cylindrical type had the fixed vane sections (length of the guide vane 30=(a diameter of the rotor)/3, and so forth). The blade angle β was an angle between the blade face and the radial line radially extended from the central shaft (see FIG. 3).

According to the results, dependency of the output power to the blade angle β of the nonparallel double plate type was the largest of all; that of the half cylindrical type was the smallest of all. In the two types, the maximum output powers were observed when the angles β were about 30 degrees; in the flat plate type, the maximum output power was observed when the angle β was 30–45 degrees. In any cases, the output powers, which were highly larger than the output power of the conventional Savonius type, can be generated by adjusting the angles β.

FIG. 12 shows variations of the output powers of the four types (the flat plate type, the half cylindrical type, the nonparallel double plate type and the conventional Savonius type) with respect to variations of the blade angles α of the guide vanes 30 of the fixed vane sections. Note that, the blade angle 30 of the guide vane α is an angle between the guide vane and the tangent line extended from the circum-circle of the rotary blades (see FIG. 3).

FIG. 12 shows graphs showing variations of power ratios "P/Ps", which are ratios of the output powers of said types of wind mills to the output power Ps of the conventional Savonius type (with no fixed vane section), with respect to variations of the angles α, wherein a wind speed was 3.0 m/sec. and the blade angles β were 30 degrees (note that, the blade angle of the conventional Savonius type was 0 degree).

According to FIG. 12, the maximum output powers were observed when the blade angles α of the guide vanes were about 40 degrees.

FIGS. 13 and 14 show the output powers of the wind mills, whose blade angles β of the rotary blades were 30 degrees and whose blade angles α of the guide vanes were 40 degrees; FIG. 13 shows relationship between tip speed ratios λ (each of which is ratio of a speed of the blade end to the wind speed) of said four types of wind mills (the flat plate type, the half cylindrical type, the nonparallel double plate type and the conventional Savonius type) and the output powers thereof.

FIG. 14 shows graphs showing the power ratios "P/Ps", which are ratios of the output powers of six types of wind mills (the flat plate type, the half cylindrical type, the shallow concave plate type, the nonparallel double plate type, the nonparallel double concave plate type and the conventional Savonius type) to the output power Ps of the conventional Savonius type (with no fixed vane section).

According to the results of the two experiments, the output power of the shallow concave plate type was larger than that of the flat plate type; the output powers of the double plate types were larger than those of the single blade types; and the output power of the nonparallel double concave plate type was the largest of the six.

7. Rotation Control Unit

As shown in FIG. 11, the output powers of the wind mills are varied according to the blade angles β of the rotary blades. Therefore, when the rotational speed of the rotary blades exceeds a prescribed speed, the rotational speed can be restricted by making the angles of the blade faces with respect to the radial lines radially extended from the central shaft larger and reducing drag forces working to the blades. The angles of the blade faces may be adjusted by an electric motor, a centrifugal force generated by the rotation of the rotary blades, etc. The method using the centrifugal force is effective because it is caused by mere rotational energy of the wind mill.

The blade angle β is usually designed at 30–45 degrees, but the rotation control unit makes the blade angle β larger when the wind speed exceeds a predetermined speed. In FIG. 15, the blade angles β are 90 degrees. In the wind mill having the rotation control unit, the blade angles β are made larger with increasing the wind speed, finally the blades are arranged as shown in FIG. 15. By making the blade angles larger, the drag forces working to the blades are reduced, so that the rotational speed of the rotary blades can be maintained even if the wind speed increases. By employing the rotation control unit, damages of the wind mill, which are caused by strong winds, can be prevented.

BRIEF DESCRIPTION OF THE DRAWINGS

FIGS. 9A–D are explanation views showing the blades and air flows, wherein FIG. 9A shows an accumulating structure, FIG. 9B shows a low collision rate structure, FIG. 9C shows a high collision rate and nonaccumulating structure (with the blades arranged in the radial form) and FIG. 9D shows a high collision rate and nonaccumulating structure (with the blades arranged in the multipoint intersection form);

FIGS. 10A–E are explanation views showing types of the rotary blades, wherein FIG. 10A shows a flat plate type, FIG. 10B shows a nonparallel double plate type, FIG. 10C shows a shallow concave (small curvature) plate type, FIG. 10D shows a nonparallel double concave plate type, FIG. 10E shows the shallow concave (small curvature) Savonius type and FIG. 10F shows a method of providing the blades of the nonparallel double plate type (a dotted line indicates a circular disk);

PREFERRED EMBODIMENTS OF THE INVENTION

Preferred embodiments of the present invention, in which the vertical shaft driving device is applied to vertical shaft wind mills, will now be described in detail with reference to the accompanying drawings.

Figure 1:
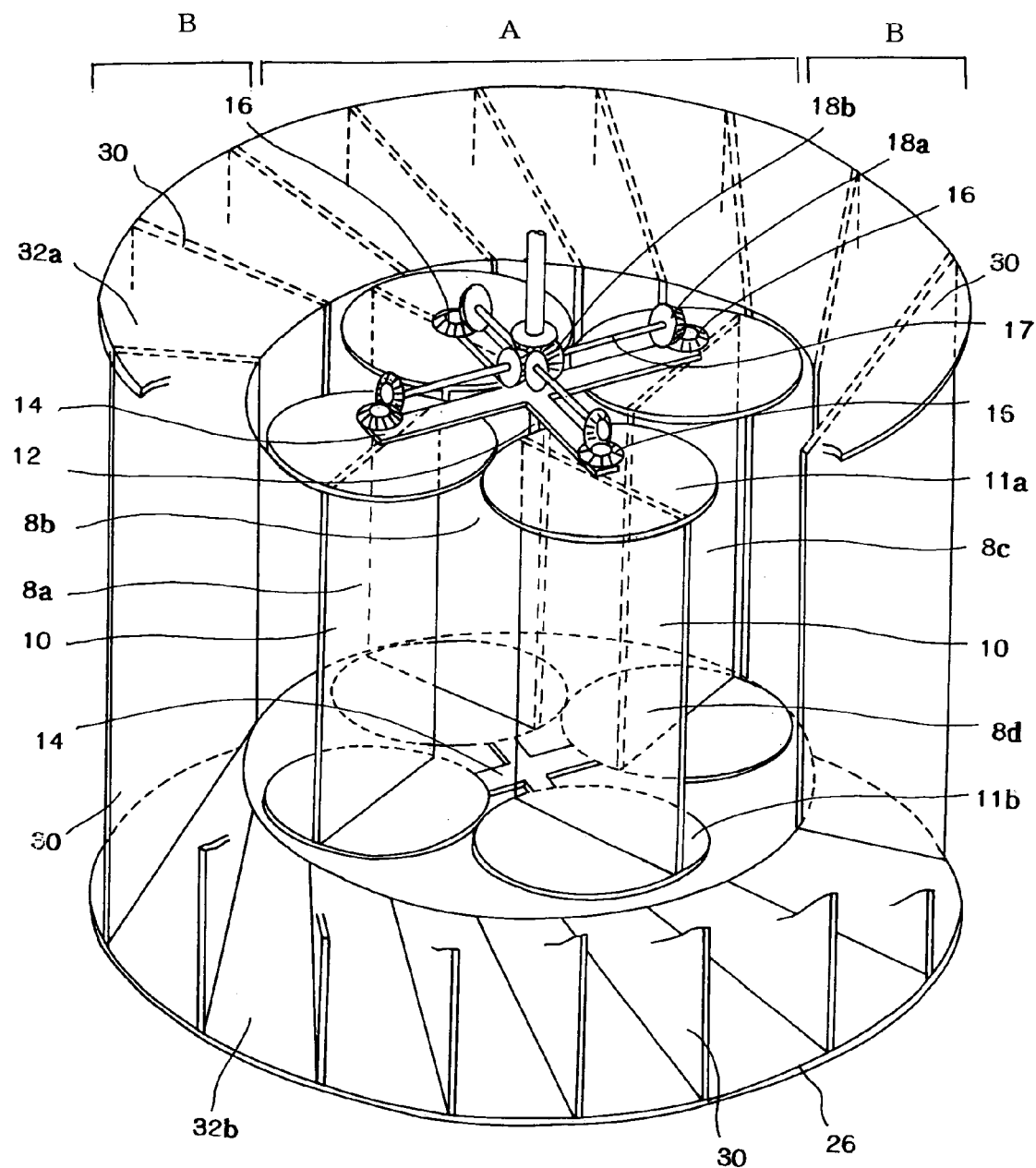
FIG. 1 is a perspective view of an embodiment of a vertical shaft wind mill relating to the present invention.
Figure 2:
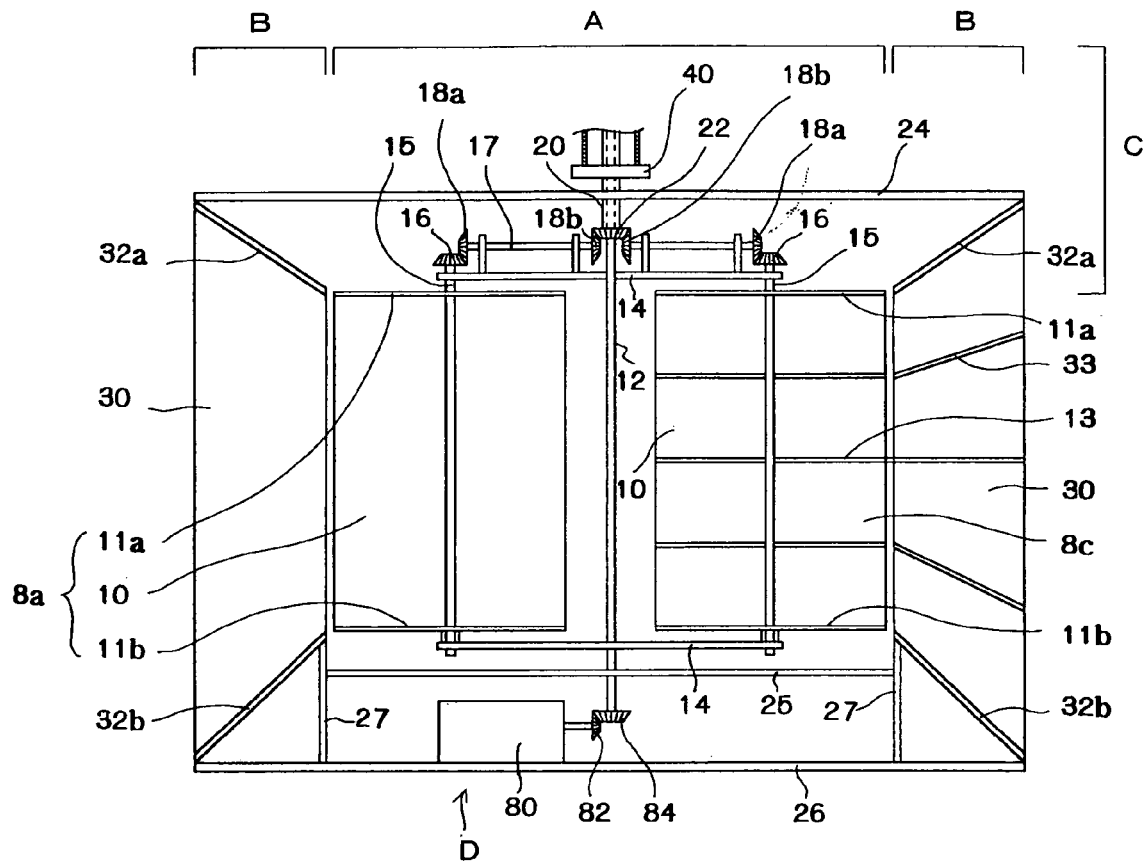
FIG. 2 is a front view of the vertical shaft wind mill.

FIG. 1 is a perspective view of an embodiment of the vertical shaft wind mill relating to the present invention, and FIG. 2 is a front view of the vertical shaft wind mill. The vertical shaft wind mill of the present embodiment has: a cylinder section A, in which rotary blades are capable of moving along a circular orbit; a fixed vane section B circumferentially provided around the cylinder section A; a rotation control unit C for controlling a rotational speed of the rotary blades; and an electric generator D.

As shown in FIG. 1, the vertical shaft wind mill of the present embodiment has the four rotary blades 8a, 8b, 8c and 8d, which are provided in the cylinder section A, and arms 14, which are fixed to a central shaft 12, rotatably hold the rotary blades 8a, 8b, 8c and 8d.

The arms 14 are radially arranged with respect to the central shaft 12 with angular separations of 90 degrees, and they are perpendicularly extended form the central shaft 12, so that the four rotary blades 8a, 8b, 8c and 8d are equally held and arranged circumferentially of the central shaft 12.

In FIG. 2, planetary shafts 15 are rotatably provided to the arms 14, which are provided to an upper end and a lower end of the central shaft 12, and the rotary blades 8a and 8c are respectively held by the planetary shafts 15 at centers in the transverse directions thereof. Distances to the planetary shafts 15, each of which holds the rotary blade, from the central shaft 12 are equal. The rotary blades 8b and 8d are similarly held by the planetary shafts 15.

Each of the rotary blades 8a, 8b, 8c and 8d includes: a blade 10; and an upper circular disk 11a and a lower circular disk 11b, which are respectively fixed to an upper end and a lower end of the blade 10. In the present embodiment, the blade 10 is a flat blade, but it may be a concave plate. As described above, the rotary blade may be formed by a plurality of blades, which are provided nonparallel between the circular disks 11a and 11b.

Figure 3:
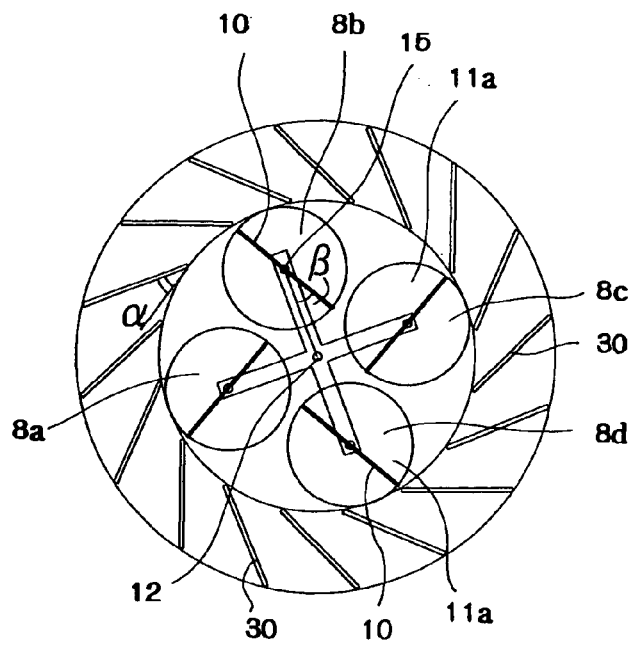
FIG. 3 is an explanation view showing an arrangement of rotary blades and guide vanes.
Figure 8A:
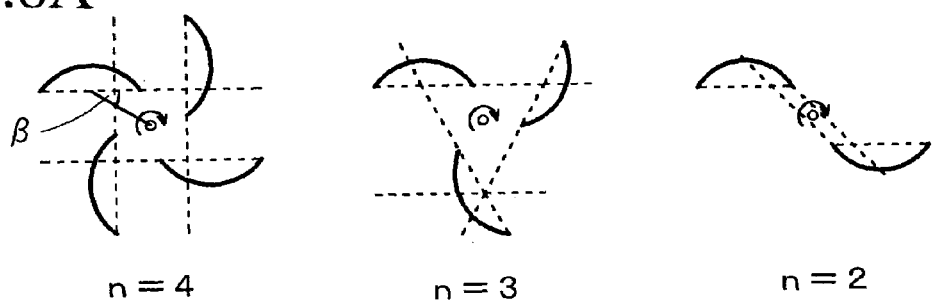
FIGS. 8A and 8B are explanation views showing a multipoint intersection form and a radial form of the blades.
Figure 8B:
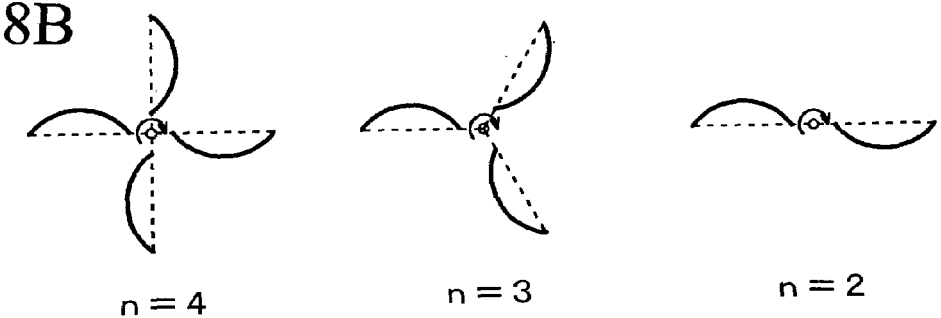
Figure 9A:
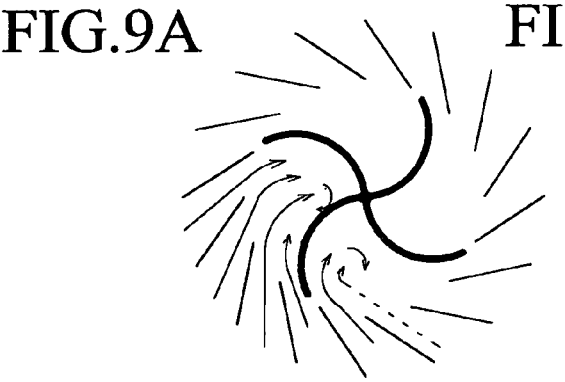
Figure 9B:
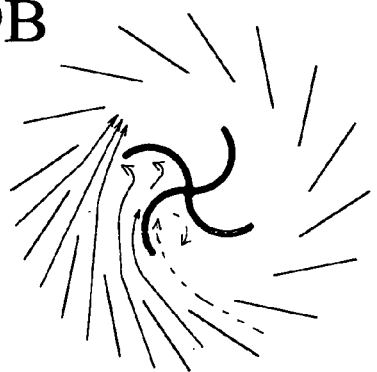
Figure 9C:
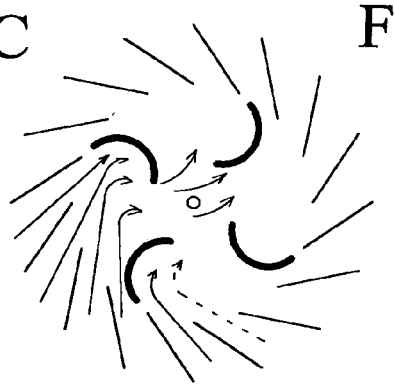
Figure 9D:
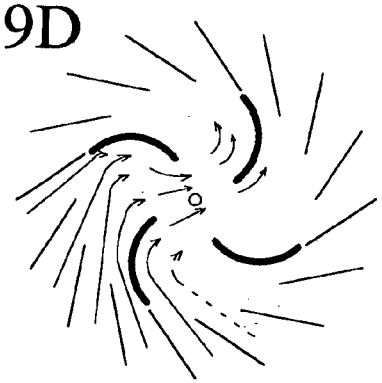
Figure 10A:
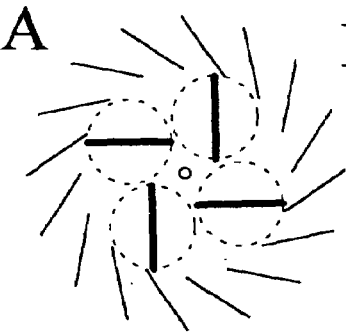
Figure 10B:
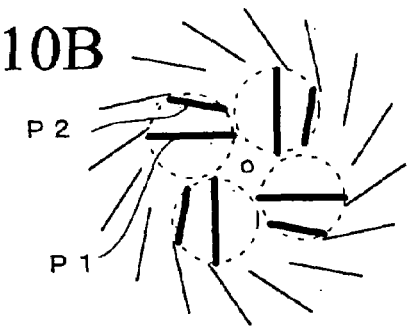
Figure 10C:
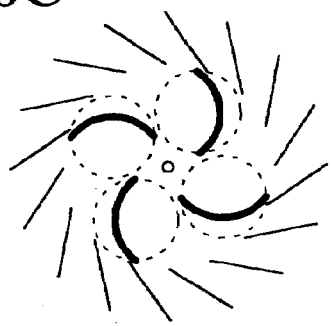
Figure 10D:
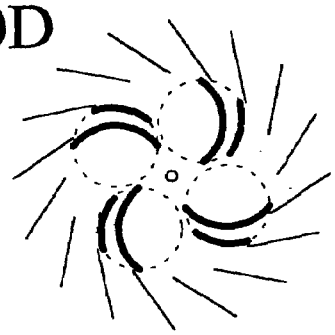
Figure 10E:
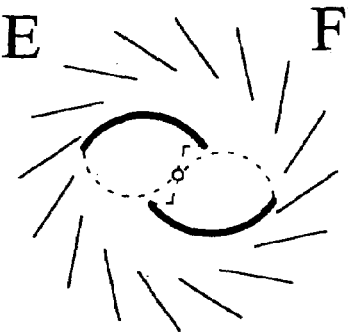
Figure 10F:
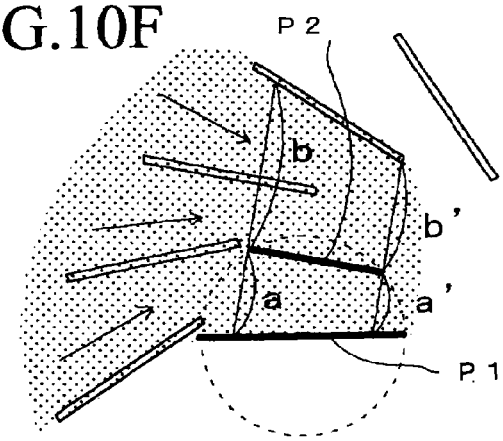
Figure 11:
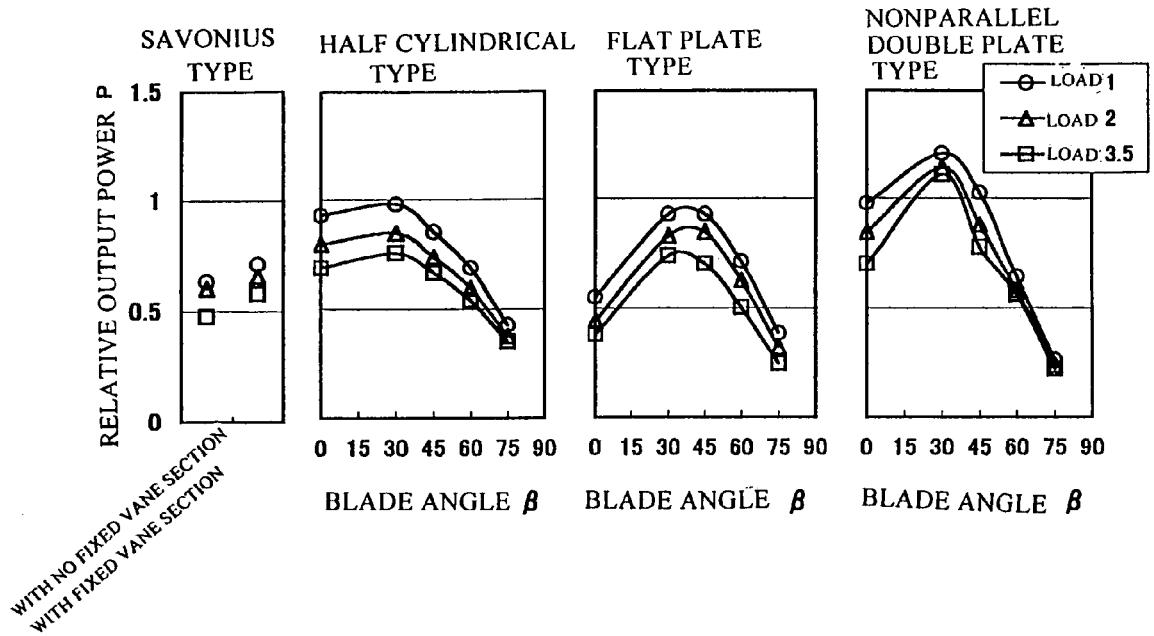
FIG. 11 shows graphs of relationships between blade angles β of the blades and output powers of the wind mills.
Figure 12:
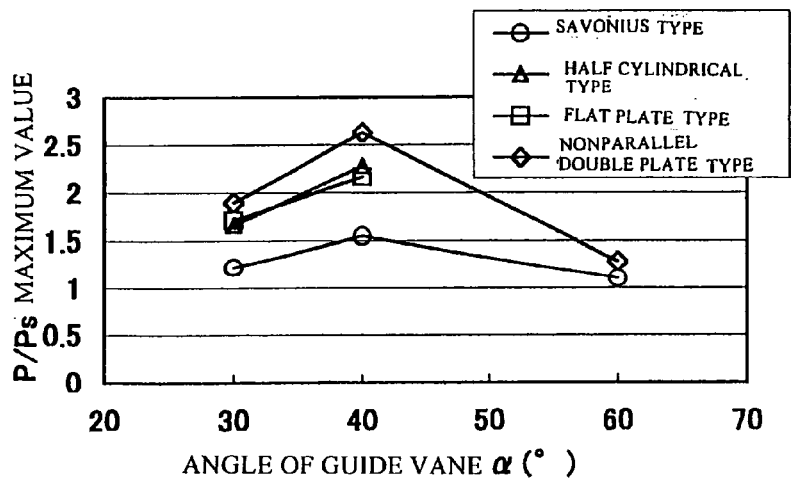
FIG. 12 shows graphs of relationships between blade angles α of a fixed vane section and output powers of the wind mills.
Figure 13:
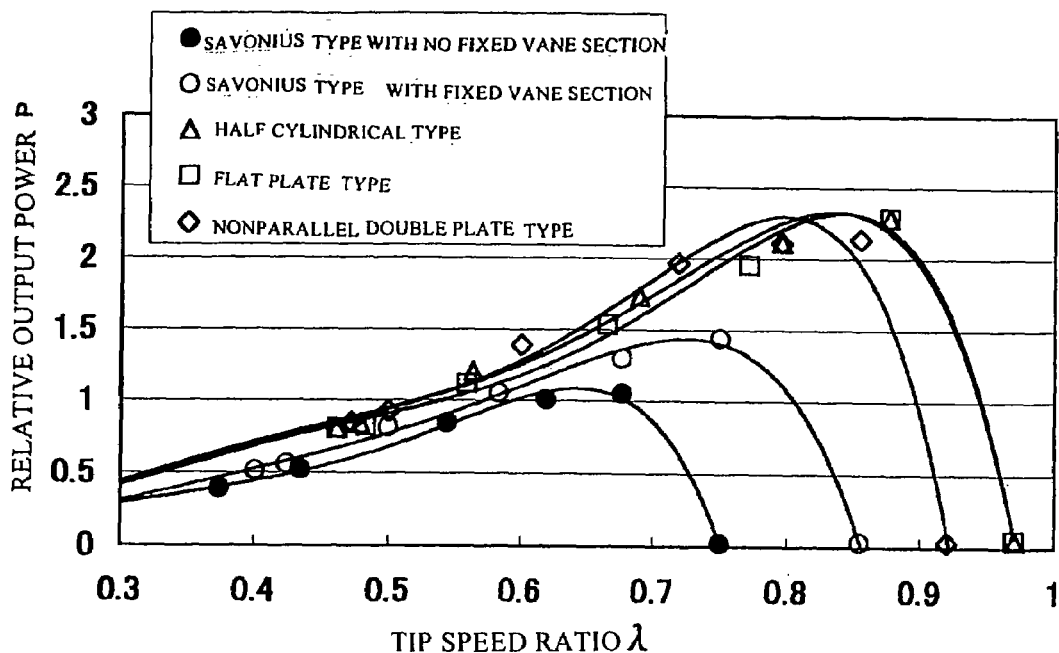
FIG. 13 shows graphs of relationships between tip speed ratios (a speed of a blade end/a wind speed) and output powers of the wind mills.
Figure 14:
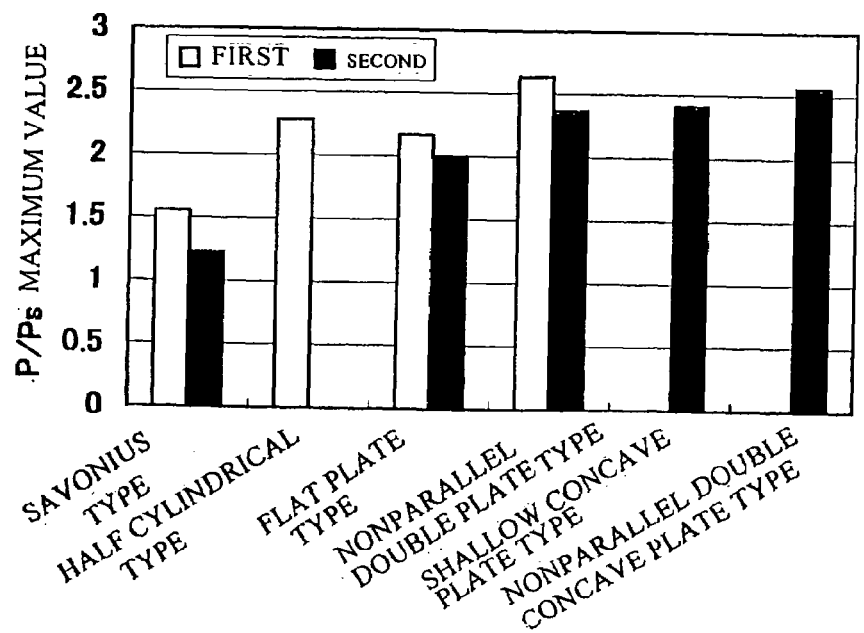
FIG. 14 shows graphs of the output powers of six types of the wind mills.
Figure 15:
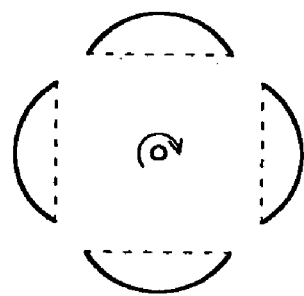
FIG. 15 is an explanation view of the rotary blades whose blade angles β is 90 degrees.
Figure 15:
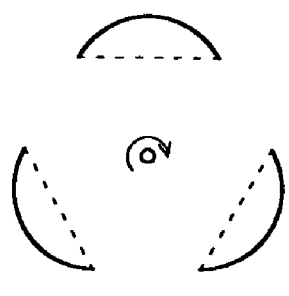
Figure 15:

As shown in FIGS. 3 and 8, the blades 10 of the rotary blades 8a, 8b, 8c and 8d are obliquely disposed, with the blade angles β, with respect to radial directions with the center at the central shaft 12.

To hold the blade 10 with obliquely disposing the blade face, with the blade angles β, with respect to the radial directions with the center at the central shaft 12, a bevel gear 16 is fixed to an upper end of the planetary shaft 15, which holds the blade 10, and a bevel gear 18a, which is provided to one end of a gear shaft 17 rotatably supported on the arm 14, is engaged with the bevel gear 16 so as to set the direction of the blade face of the blade 10.

When each blade 10 is moved around the central shaft 12, the angle of the blade face with respect to the radial direction with the center at the central shaft 12 should be maintained. In the present embodiment, the bevel gear 18b, which is provided to the end of the shaft 17, is engaged with a bevel gear 22, which is provided to a blade shaft 20 covering an upper part of the central shaft 12, so that the bevel gear 22 can be always rotated together with the central shaft 12, and the blade face of each blade 10 can be maintained the angle β during the orbital motion.

As described above, in the case of the flat plate type blade 10, the suitable angle β of the blade face with respect to the radial direction with the center at the central shaft 12 is 30–45 degrees so as to obtain the highest rotation efficiency; in the cases of other types, the suitable angle is about 30 degrees. By adjusting the angle of the blade face of each blade 10, a line extended in the direction of the blade face intersects the adjacent blade 10 so that the rotary blades can be arranged in the multipoint intersection form.

As shown in FIG. 2, the cylinder section A, in which the rotary blades 8a, 8b, 8c and 8d are rotated, is supported by an upper plate 24, a bottom plate 25, a base plate 26 and pillars 27, so that an upper and a lower faces of the cylinder section A are closed. The upper plate 24 and the base plate 26 are formed into circular disks, and a circumferential face of the section is wholly opened.

The fixed vane section B, in which a plurality of guide vanes 30 are circularly arranged at regular intervals, is provided around the cylinder section A, which is sandwiched between the upper plate 24 and the base plate 26. Slant plates 32a and 32b are respectively provided to the upper plate 24 and the base plate 26 to enclose them. The slant plates 32a and 32b introduce winds, which have entered the fixed vane section from an upper part and a lower part thereof, to the rotary blades 8a, 8b, 8c and 8d. In the present embodiment, sweep area (introducing area) can be upwardly and downwardly broader than sweep area corresponding to height of the rotary blades 8a, 8b, 8c and 8d, so that winds can be efficiently introduced.

The guide vanes 30 connect the base plate 26 with the upper plate 24 and introduce winds into the cylinder section A of the wind mill.

Arrangement of the guide vanes 30 of the present invention is shown in FIG. 3. In the present embodiment, 16 guide vanes 30 are arranged in the circumferential direction of the cylinder section A. A setting angle of each guide vane 30, which is an angle between the guide vane and a tangent line extended from an outer circumference of the rotary blades (a tangent line extended from an outer circumference of the cylinder section A), is about 40 degrees. The guide vanes 30 are obliquely arranged so as to introduce air flows in the suitable direction to efficiently rotate the rotary blades 8a, 8b, 8c and 8d in the cylinder section. Namely, air flows are introduced to collide with the rotary blades 8a, 8b, 8c and 8d so as to accelerate the rotation of the rotary blades; and moreover air flows hindering the rotation of the rotary blades 8a, 8b, 8c and 8d are introduced to avoid collision with the rotary blades.

In the present embodiment, 16 guide vanes 30 are provided, but number of the guide vanes 30 is not limited, so the number may be determined on the basis of the size of the wind mill, etc.

The guide vanes 30 collect, block off and straighten air flows; therefore, the straightened strong air flows can collide with the rotary blades 8a, 8b, 8c and 8d in comparison with the case of installing the rotary blades 8a, 8b, 8c and 8d in the air flows with no fixed vane section, so that the output power of the wind mill can be improved.

By providing the slant plates 32a and 32b on the upper side and the lower side of the guide vanes 30, winds, which enter the fixed vane section from an upper side and a lower side of the rotary blades 8a, 8b, 8c and 8d, can be introduced to the rotary blades 8a, 8b, 8c and 8d so as to increase a force for rotating the wind mill.

Figure 4:
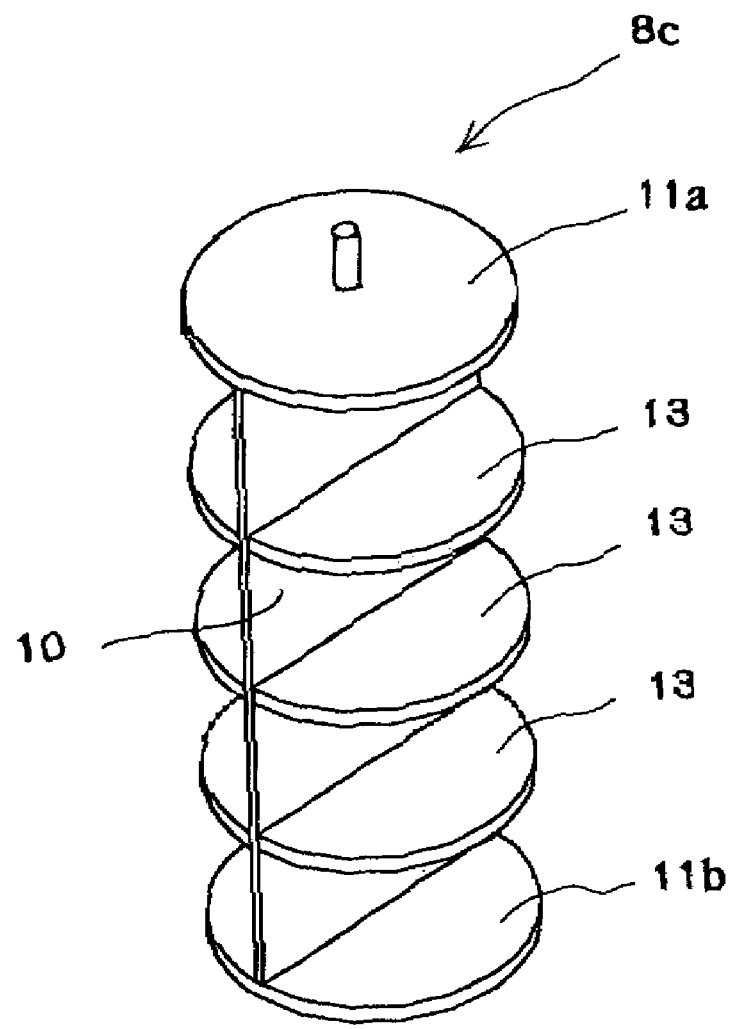
FIG. 4 is a perspective view of the rotary blade having rectifying plates.

Note that, in the right half of FIG. 2, rectifying plates 33 are provided between the upper and the lower slant plates 32a and 32b, which are respectively provided on the upper side and the lower side of the fixed vane section, at regular intervals, and rectifying plates 13 is provided to the rotary blade 8c. FIG. 4 is a perspective view of the rotary blade having the rectifying plates 13. Each rectifying plate 13 is formed into a circular plate similar to the upper circular disk 11a and the lower circular disk 11b, arranged in parallel to the upper circular disk 11a and the lower circular disk 11b, and pinches the blade 10 from a forward side and a rear side. Levels of inner ends of the rectifying plates 33 of the fixed vane section are equal to levels of the rectifying plates 13 of the rotary blade 8c, so that air flows, which enter the fixed vane section, are straightened and introduced to the rotary blade 8c.

In the right half of FIG. 2, the rectifying plates 13 and 33 are shown; in the case of providing the rectifying plates, the rectifying plates should be provided to the whole fixed vane section and all of the rotary blades 8a, 8b, 8c and 8d.

By providing the rectifying plates 33 to the fixed vane section, rectifying function of the fixed vane section can be improved; by providing the rectifying plates 13 to the rotary blades, rate of colliding air flows with the rotary blades can be increased.

As described above, the output power of the wind mill is varied by angles of the rotary blades 8a, 8b, 8c and 8d with respect to the radial direction with the center at the central shaft 12. Therefore, the rotational speed of the rotary blades 8a, 8b, 8c and 8d can be maintained by adjusting the angles of the rotary blades 8a, 8b, 8c and 8d by a centrifugal force of the rotating wind mill.

The rotation control unit will be explained with reference to FIG. 5.

Figure 5A:
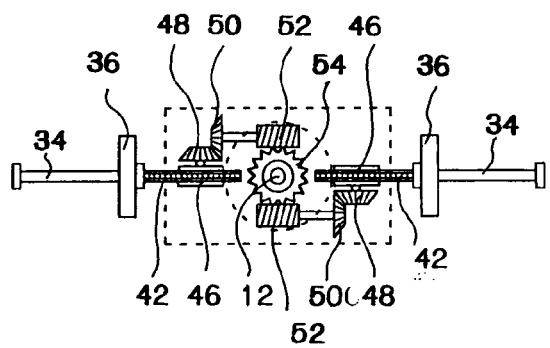
FIGS. 5A–C are a plan view, a front view and a side view of a rotation control unit.
Figure 5B:
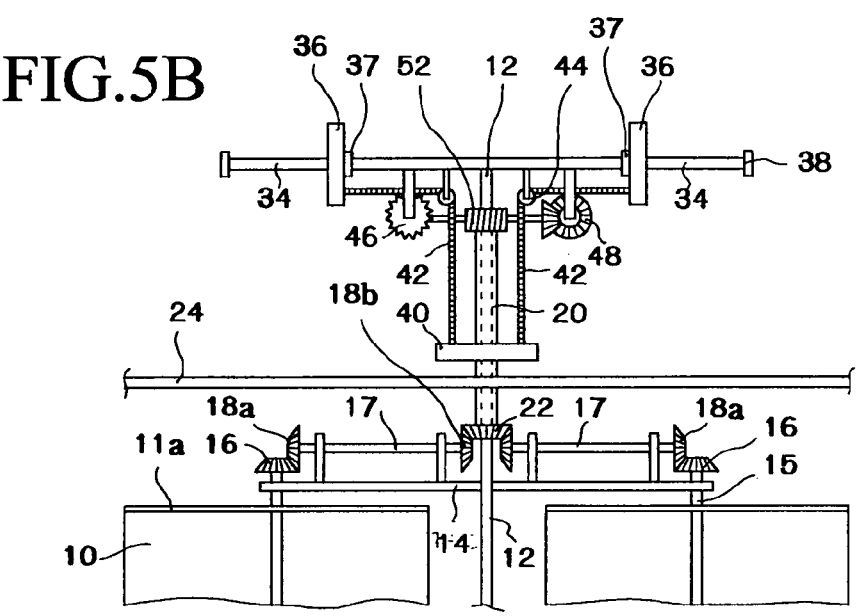
Figure 5C:
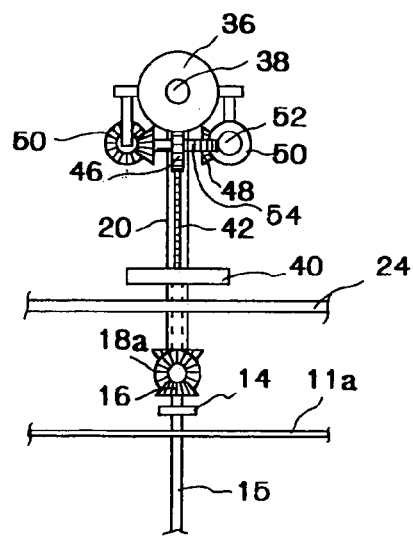

FIGS. 5A–C are a plan view, a front view and a side view of the rotation control unit. As shown in FIG. 5B, the bevel gear 16, which is fixed to each planetary shaft 15, and the bevel gear 22, which is fixed to the lower end of the control shaft 20 covering the central shaft 12, are respectively engaged with bevel gears 18a and 18b, which are respectively fixed to ends of each shaft 17 supported by the arm 14, so that the blades 10 of the rotary blades 8a, 8b, 8c and 8d can be set with the prescribed blade angle.

In FIG. 5B, weight arms 34 are symmetrically arranged, fixed to the upper end of the central shaft 12, and perpendicularly extended from the central shaft 12. Weights 36, 36 for sensing the centrifugal force are slidably attached to the arms 34. Symbols 37 and 38 stand for stoppers for limiting the movement of the weights 36.

A weight 40 for sensing the gravity covers the shaft 20 and is capable of moving in the vertical direction. Roller chains 42 connect the weight 40 to the weights 36 via guide rollers 44.

As shown in FIGS. 5A and 5B, gears 46 and 46 are engaged with the roller chains 42 and 42 at mid positions of the roller chains 42 and 42, and first bevel gears 48 and 48 are coaxially fixed to the gears 46 and 46. The first bevel gears 48 and 48 are respectively engaged with second bevel gears 50 and 50, and worm gears 52 and 52, which are fixed to shafts of the second bevel gears 50 and 50, are engaged with a center gear 54, which is fixed to the shaft 20. Worm gears 52 and 52 are disposed on the opposite sides with respect to the center gear 54, rotary driving forces of the gears 46 and 46 are applied to the center gear 54 as a couple of forces when the roller chains 42 and 42 are moved.

In the rotation control unit of the present embodiment, the lowest position of the weight 40 for sensing the gravity is a normal position, and the angle of the blades 10 of each rotary blade 8a, 8b, 8c and 8d is set at a prescribed angle when the weight is positioned at the normal position. When the centrifugal force working to the weights 36 and 36 is larger than the gravity working to the weight 40, the weights 36 and 36 begin to move outward on the arms 34 from initial positions, at which the weights contact the stoppers 37, and the roller chains 42 are moved so that the gears 46 are rotated. The rotation of the gears 46 are transmitted to the center gear 54 via the first bevel gears 48 and the second bevel gears, which are mutually engaged, and the worm gear 52, so that the center gear 54 is rotated. In the rotation control unit, when a wind power is increased and the centrifugal force working to the weights 36 is larger, the blade angles β of the blades 10 of the rotary blades 8a, 8b, 8c and 8d, which are angles with respect to the radial directions with center at the central shaft 12, are made larger.

The blade angles β of the blades 10 of the rotary blades 8a, 8b, 8c and 8d with respect to the radial directions with center at the central shaft 12 are usually set at 30–45 degrees; when the wind speed exceeds a predetermined speed, the rotation control unit makes the blade angles β larger, so that drags working to the blades 10 are reduced and the rotational speed of the rotary blades can be maintained. When strong wind works to the wind mill, excessive high speed rotation of the rotary blades 8a, 8b, 8c and 8d can be prevented by the rotation control unit, so that damaging the wind mill can be prevented and the wind mill can be stably operated.

Figure 6:
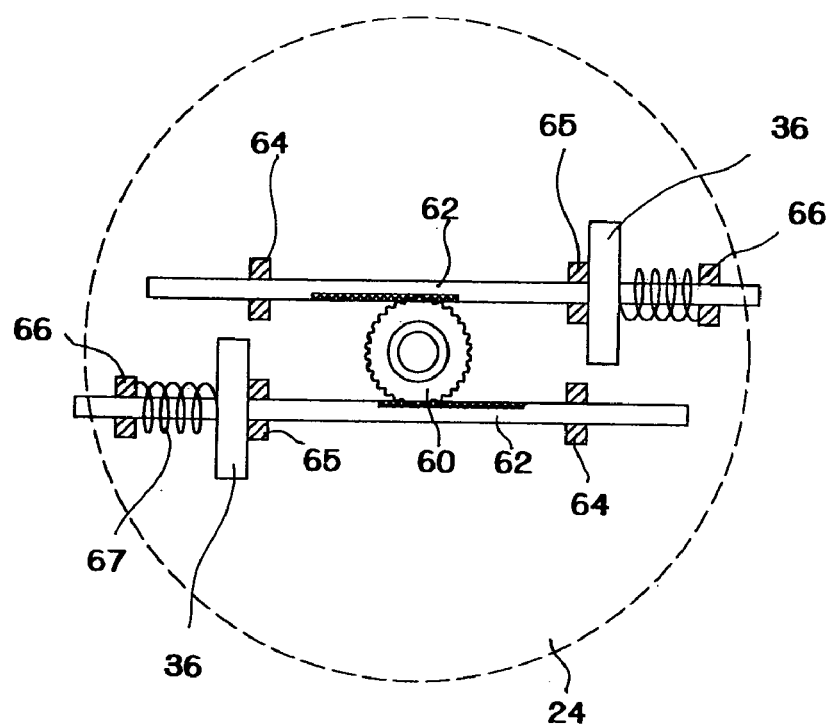
FIG. 6 is an explanation view of another rotation control unit.

Other examples of the rotation control unit, which are capable of controlling the blade angles β of the blades 10 with respect to the radial directions with the center at the central shaft 12, are shown in FIGS. 6 and 7. In the rotation control unit shown in FIG. 6, a gear 60 is connected to the bevel gear 22, and the gear 60 is engaged with a couple of movable bars 62 and 62, each of which has a gear section and are capable of moving on the upper plate 24. Symbols 64, 65 and 66 stand for guide pillars, which guide the movable bars 62 in prescribed directions; a symbol 67 stands for springs. Further, the guide pillars 65 and 66 work as stoppers for limiting the movement of the movable bars 62. The weights 36 for sensing the centrifugal force are fixed to the movable bars 62, and they are always biased to contact side faces of the guide pillars 65 by elasticity of the springs 67. In the rotation control unit of the present example, when the wind speed increases and the centrifugal force working to the weights 36 is larger, the movable bars 62 and 62 are moved outward against the elasticity of the springs 67, so that the blade angles of the blades 10 of the rotary blades are changed and the drags working to the blades 10 are reduced.

Figure 7A:
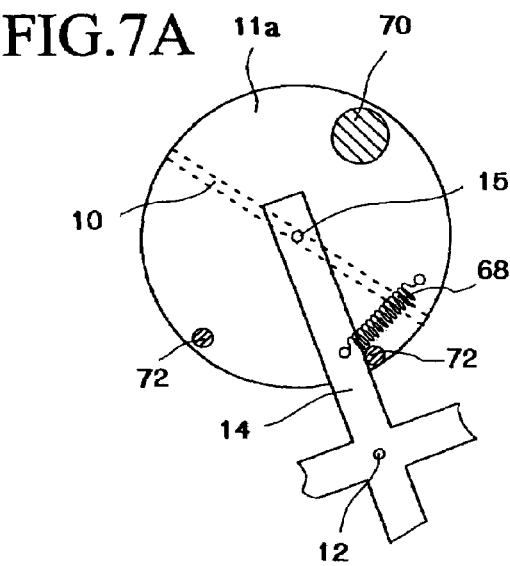
FIGS. 7A and 7B are explanation views of another rotation control unit.
Figure 7B:
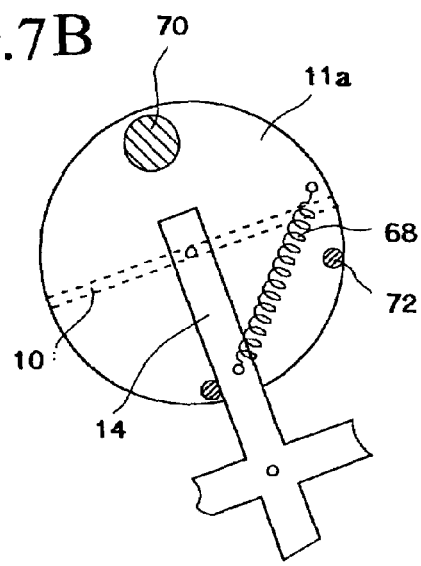

In the rotation control unit shown in FIG. 7, springs 68 are provided between each arm 14, which holds the rotary blade, and the upper and the lower circular disks 11a of each of the rotary blades 8a, 8b, 8c and 8d; and weights for sensing the centrifugal force are fixed to the upper and the lower circular disks 11a of each rotary blade and located at prescribed positions, each of which is closed to an outer edge of the circular disk and at each of which a radial line extended from a center of the circular disk intersects the blade at 90 degrees. Symbols 72 stand for stoppers for limiting the angle of the blade 10. FIG. 7A shows the angle of the blade 10 when the wind speed is low; FIG. 7B shows the angle of the blade 10 when the wind speed is high. When the wind speed increases, the angle of the blade 10 is changed by the centrifugal force working to the weights 70; therefore the angle of the blade 10 can be changed according to the wind speed by adjusting the elasticity of the springs 68. In the case of employing the nonparallel double plate type rotary blades, the gravity center of each rotary blade is one-sided, so it is advantageous to attach the weights 70 so as to securely apply a rotational force, which is caused by the centrifugal force, to the rotary blades.

Note that, the rotation control unit is not limited to the above described units, so the blade angle may be controlled by, for example, sensing the wind speed or the rotational speed of the wind mill and changing the blade angle by an electric motor, etc.

In the above described embodiment, an electric generator 80 is provided in a lower part of the wind mill, a bevel gear 82, which is fixed to a drive shaft of the generator 80, is engaged with a bevel gear 84, which is fixed to the lower end of the central shaft 12, so as to drive the generator 80 by rotation energy of the rotary blades 8a, 8b, 8c and 8d.

Note that, many kinds of means for connecting the generator 80 with the central shaft 12 and transmitting the rotation energy of the rotary blades 8a, 8b, 8c and 8d to the generator 80 may be employed.

The invention claimed is:

1. A vertical shaft driving device, comprising:
   four rotary blades arranged in a circumferential direction of a central shaft and capable of orbital motion integrally with said central shaft, and a line extended from a blade face of each rotary blade intersects a blade face of an adjacent rotary blade at a right angle;
   a cylinder section, in which a rotor having said central shaft and said rotary blades can be rotated;
   a fixed vane section being provided to enclose said cylinder section, said fixed vane section having a plurality of guide vanes, which are arranged in the circumferential direction at regular intervals so as to straighten air or water flows and introduce them to said rotary blades; and
   a plurality of arms, which are radially extended from said central shaft at regular angular intervals, said arms being rotated together with said central shaft,
   wherein the blade faces of the blades diagonally intersect the radial lines from said central shaft at an angle of 30–45 degrees so collide the air or water flows collide sequentially with multiple blades of the four rotary blades.

2. The vertical shaft driving device according to claim 1, wherein an inner end of said fixed vane section is located close to outer ends of the blades, which move round in said cylinder section, so as to collide said rotary blades with the air or water flows with a high collision rate.

3. The vertical shaft driving device according to claim 1, wherein inner edges of said adjacent blades are separated from each other in said cylinder section so as not to accumulate the air or water flows on a central shaft side.

4. The vertical shaft driving device according to claim 1, wherein a rectifying plate, which straightens and introduces the air or water flows to said rotary blades, is provided to said fixed vane section.

5. The vertical shaft driving device according to claim 1, wherein each of said rotary blades has: an upper circular disk, which is provided to an upper end of the blade; a lower circular disk, which is provided to a lower end of the blade; and a circular rectifying plate, which is provided in parallel to and between the upper and the lower circular disks and which is extended from both faces of the blade.

6. The vertical shaft driving device according to claim 1, wherein each of said rotary blades is formed into a shallow concave small curvature plate, whose curvature is smaller than that of a half-cylindrical blade of a paddle type vertical shaft wind mill so as to restrict the air or water flows, which is introduced by said fixed vane section, to collide with rear faces of said rotary blades.

7. The vertical shaft driving device according to claim 1, wherein each of the blades is formed into a flat plate as a main blade and has at least one sub-flat blade, which is provided nonparallel on a forward side or a wind receiving face side of each main blade so as to form a nonparallel double plate type blade, whereby generating a counter force, whose direction is opposite to a rotational direction, can be prevented, and total area of the blades can be broadened to improve efficiency of kinetic energy of the air or water flows.

8. The vertical shaft driving device according to claim 7, wherein each of the sub-flat blades, which is provided on the forward side or the wind receiving face side of the main blade, is headed to make a passage section ratio, which is a ratio of a passage section of the fluid on a front side of the sub-flat blade to that on a rear side thereof, at a front edge equal to that at a rear edge.

9. The vertical shaft driving device according to claim 1, wherein each of the blades is formed into a shallow concave small curvature plate, whose curvature is smaller than that of a half-cylindrical blade of a paddle type vertical shaft wind mill so as to restrict the air or water flows, which is introduced by said fixed vane section, to collide with rear faces of said rotary blades, as a main blade and has at least one sub-shallow concave small curvature blade, which is provided nonparallel on a forward side or a wind receiving face side of the main blade so as to form a nonparallel double concave plate type blade, whereby generating a counter force, whose direction is opposite to a rotational direction, can be prevented, and total area of said rotary blades can be broadened to improve efficiency of kinetic energy of the fluid.

10. The vertical shaft driving device according to claim 1, further comprising a rotation control unit, which makes angles of the blade faces of the blades with respect to the radial lines, which are extended from said central shaft, larger, with increasing the rotational speed of the rotary blades, so as to reduce drag forces working to the blades and a rotational speed of said rotary blades when the rotational speed of said rotary blades exceeds a prescribed speed.

11. An electric generator being connected to said vertical shaft driving device according to one of claims 1–10, wherein a torque of said central shaft is transmitted to said electric generator.

* * * * *